United States Patent [19]
Sakamoto

[11] Patent Number: 5,774,233
[45] Date of Patent: Jun. 30, 1998

[54] DOCUMENT IMAGE PROCESSING SYSTEM

[75] Inventor: Hirotaka Sakamoto, Fukuoka, Japan

[73] Assignee: Matsushita Electric Industrial Co., Ltd., Osaka, Japan

[21] Appl. No.: 321,852

[22] Filed: Oct. 14, 1994

Related U.S. Application Data

[63] Continuation-in-part of Ser. No. 163,691, Dec. 9, 1993.

[51] Int. Cl.$^6$ .............................. H04N 1/393; H04N 1/40
[52] U.S. Cl. .......................... 358/451; 358/448; 358/444; 358/450; 358/400; 345/126
[58] Field of Search .................................... 358/448, 400, 358/500, 451, 452, 453, 449, 527, 444, 528, 537, 540, 401, 450; 348/827, 831, 836; 345/126, 127; 382/296, 297

[56] References Cited

U.S. PATENT DOCUMENTS

| | | | |
|---|---|---|---|
| 4,267,555 | 5/1981 | Boyd et al. | 345/126 |
| 4,542,377 | 9/1985 | Hagen et al. | 345/126 |
| 5,134,390 | 7/1992 | Kishimoto et al. | 345/126 |
| 5,172,103 | 12/1992 | Kita | 345/127 |
| 5,329,289 | 7/1994 | Sakamota | 345/126 |
| 5,334,994 | 8/1994 | Takagi | 345/127 |

FOREIGN PATENT DOCUMENTS

| | | |
|---|---|---|
| 1314382A | 12/1878 | Japan . |
| 57-13479A | 1/1982 | Japan . |
| 232423(A) | 10/1986 | Japan ....................................... 345/87 |
| 62-173509 | 7/1987 | Japan . |
| 62-299881 | 12/1987 | Japan . |

*Primary Examiner*—Edward L. Coles, Sr.
*Assistant Examiner*—Fan Lee
*Attorney, Agent, or Firm*—Watson Cole Stevens Davis, P.L.L.C.

[57] ABSTRACT

A document image processing system includes a menu display part determining the layout of menu data on the basis of the height Ha and the width Wa of the displayable area of the display unit when the display unit is rotated to its vertical position, the height Hb and the width Wb of the displayable area when the display unit is rotated to its horizontal position and the width Wc and the height Hc of a selection item display area displaying menu data, and displaying the menu on the basis of the layout thus determined, so that the menu can be displayed with a maximum size on the displayable area of the display unit regardless of the height and width of the displayable area changing depending on the direction of rotation of the display unit and without changing the size and arrangement of the menu data in the menu display area. The size of the menu display area is selected to be capable of erected display on both the displayable area of the display unit in its vertically rotated position and that of the display unit in its horizontally rotated position, and the selection item display area is disposed in the menu display area of the above size so as to determine the menu data to be displayed, so that the determined menu data can be directly displayed on the display unit regardless of the rotating direction of the display unit.

9 Claims, 14 Drawing Sheets

M  MENU DISPLAY AREA
B  SELECTION ITEM

FIG.7B

SEARCH 1: APPLICATION PUBLICATION LIST

KEYWORD TABLE — REMAINDER 96%

| | A | B | C |
|---|---|---|---|
| | NO KEYWORD | | |
| | CLASSIFICATION | IPC | OPERATION DEPARTMENT |
| 1 | PATENT | A47K | 1ST DEPARTMENT |
| 2 | UTILITY MODEL | A47L | 3RD DEPARTMENT |
| 3 | | A61H | 4TH DEPARTMENT |
| 4 | | B01D | 5TH DEPARTMENT |
| 5 | | B02C | 6TH DEPARTMENT |
| 6 | | B41J | FA GROUP |
| 7 | | B41L | INFORMATION 1-1 |
| 8 | | B43L | INFORMATION 1-2 |
| 9 | | B65H | INFORMATION 2-1 |
| 10 | | F04D | INFORMATION 2-2 |

IMAGE DISPLAY | DOCUMENT TABLE DISPLAY | DOCUMENT NAME SEARCH | INDEX SEARCH | MARKER SEARCH | | | RETURN

MAIN MENU | FUNCTION1 | TOOL BOX | MANIPULATION EXPLANATION

Wg × Hg

DOCUMENT IMAGE PROCESSING SYSTEM

CROSS-REFERENCE TO RELATED APPLICATION

The present application is a Continuation-In-Part of U.S. patent application Ser. No. 08/163,691 filed on Dec. 9, 1993. The disclosure of that application is incorporated herein by reference.

BACKGROUND OF THE INVENTION

This invention relates to a method for displaying the menu of contents and commands on a rotatable display unit of a document image processing system of the type in which the menu can be always displayed in an erected form on the screen in a relation conforming to the rotation of the display unit in the vertical or horizontal direction.

Various document image processing systems of this kind are already known in the art. In one of the prior art systems, the mode of menu display is changed so that the menu can be displayed in an erected form in a relation conforming to the rotation of its display unit in the vertical or horizontal direction, as disclosed in JP-A-57-13479. In another prior art system of this kind, document images are directly displayed on its display unit, while the menu such as that of function keys only is displayed in an erected form in a relation conforming to the rotation of its display unit in the vertical or horizontal direction, as disclosed in JP-A-62-173509 and JP-A-62-299881. In still another prior art system of this kind, the content of a menu is displayed on its display unit in an erected form in a relation conforming to the rotation of the display unit in the vertical or horizontal direction, and the menu display size is suitably changed, as disclosed in JP-A-1-314382.

The menu displaying method used in the aforementioned prior art document image processing systems will now be described by reference to FIGS. 11A to 13B.

Referring first to FIGS. 11A and 11B, the reference numeral 20 designates a display screen of a display unit, the reference symbol M designates a menu display area of the display screen 20, the reference symbol F designates function keys, and the reference symbol B designates selection items of the menu. The left-hand side part of FIG. 11A indicates the display screen 20 when the display unit is rotated in the vertical direction, while the right-hand side part of FIG. 11A indicates the display screen 20 when the display unit is rotated in the horizontal direction.

The displayable area of the display screen 20 is generally rectangular in shape. It will be seen in FIG. 11A that the width of the displayable area of the display screen 20 is smaller than its height when the display unit is rotated to its vertical position, while the former is larger than the latter when the display unit is rotated to its horizontal position. The state that the display unit is rotated in the vertical direction is a state (vertically oblong state) wherein the longer side of the rectangular-shaped displayable area is along the vertical direction. The state that the display unit is rotated in the horizontal direction is a state (horizontally oblong state) wherein the shorter side of the rectangular-shaped displayable area is along the horizontal direction.

A problem as described below arises when the number of dots in the vertical direction of the display screen 20 differs from the number of dots in the horizontal direction. That is, when a plurality of selection items B are disposed in both the vertical direction and the horizontal direction, a larger number of selection items B can be displayed on the menu display area M. However, when, in this case, the resultant size of the menu display area M is excessively long in the vertical or horizontal direction, the desired display of the menu in the erected form in the relation conforming to the direction of rotation of the display unit cannot be achieved, because the menu display area M cannot be accommodated within the extent of the display screen 20 as shown on the right-hand side parts of FIGS. 11A and 11B respectively.

In an effort to solve this problem, a method is proposed in which the size of the menu display is changed so as to conform to the rotation of the display unit in the vertical or horizontal direction, as disclosed in JP-A-1-314382 cited above. However, when the above proposal is relied upon to reduce the displaying size of the selection items B so as to display the selection items B of reduced size, this attempt leads to the problem that the characters and images in the selection items B become too small to be easily recognized by the eye of the operator, as shown on the right-hand side parts of FIGS. 12A and 12B respectively. In another method proposed hitherto, the arrangement of the selection items B is changed to conform to the rotation of the display unit so as to display such selection items B. However, because the positions of the individual selection items B change as shown in FIGS. 13A and 13B according to this method, the operator must confirm the positions and particulars of the selection items B each time the display unit is rotated, and this leads to the problem that the operability of the document image processing system is inevitably degraded.

SUMMARY OF THE INVENTION

With a view to solve the prior art problems pointed out above, it is an object of the present invention to provide, in a document image processing system, a method for displaying a menu in a form that can be easily recognized.

According to the present invention which attains the above object, when applied to a document image processing system including a rotatable display unit having a display screen of rectangular shape, a menu screen showing menu data according to a standard format can be displayed in an erected form as well as in a constant layout and size regardless of whether the display unit is rotated in the vertical direction or the horizontal direction, so that the user can always view a similar display (that is, the menu can be always displayed in an erected form) in each of the cases where the display unit is located in its vertically oblong state and in its horizontally oblong state.

BRIEF DESCRIPTION OF THE DRAWINGS

FIGS. 7A and 7B illustrate other practical examples of a menu screen displayed according to the menu displaying method used in the first embodiment of the present invention;

DETAILED DESCRIPTION OF THE PREFERRED EMBODIMENTS

A first embodiment of the present invention will now be described by reference to the accompanying drawings.

Figure 1:
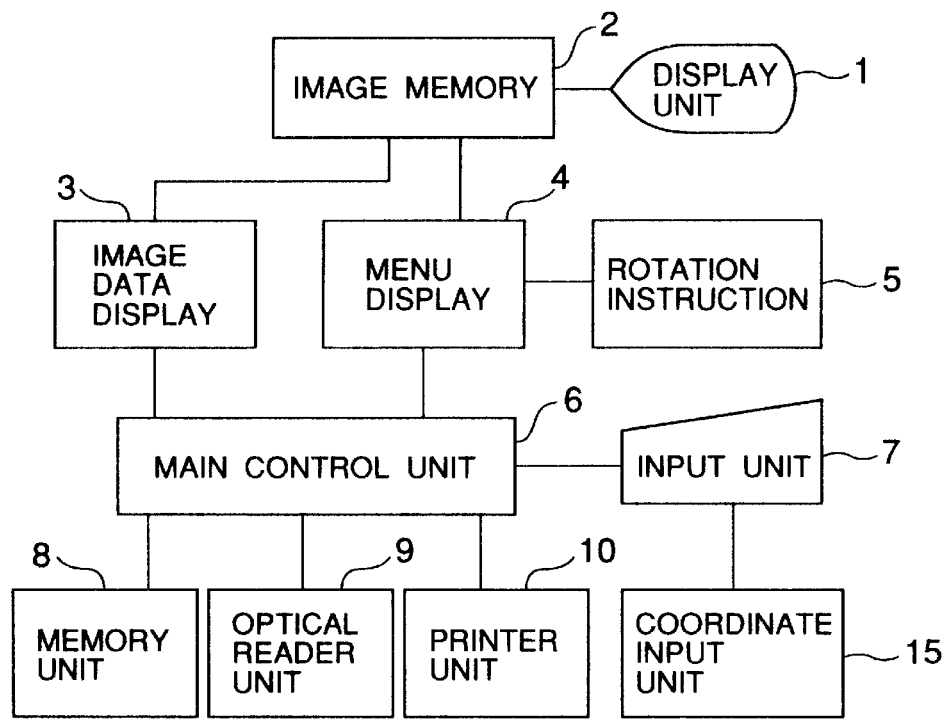
FIG. 1 is a block diagram showing the structure of a document image processing system according to a first embodiment of the present invention.

FIG. 1 is a block diagram showing the structure of a document image processing system according to the first embodiment of the present invention.

Referring to FIG. 1, the document image processing system includes a display unit 1, such as a CRT or an LCD, supported on a housing 11 (FIG. 2) of the processing system so as to be freely rotatable in both the vertical direction and the horizontal direction, an image memory 2, an image data display part 3 controlled by a main control unit 6 (described later) to supply image data to the image memory 2, a menu display part 4, a rotation instruction unit 5 detecting the rotation of the display unit 1 in the vertical or horizontal direction so as to instruct change-over of display data on the basis of the result of the rotation detection, a main control unit 6, such as, a CPU controlling the operation of the entire document image processing system, an input unit 7, such as, a keyboard, a memory unit 8 storing, for example, the software relating to a flow chart shown in FIG. 3, an optical reader unit 9, such as, an image scanner, a printer unit 10, and a coordinate input unit 15, such as, a mouse. The display unit 1 has a display screen 20 of rectangular shape as shown in FIGS. 4A, 4B and 4C.

Figure 2:
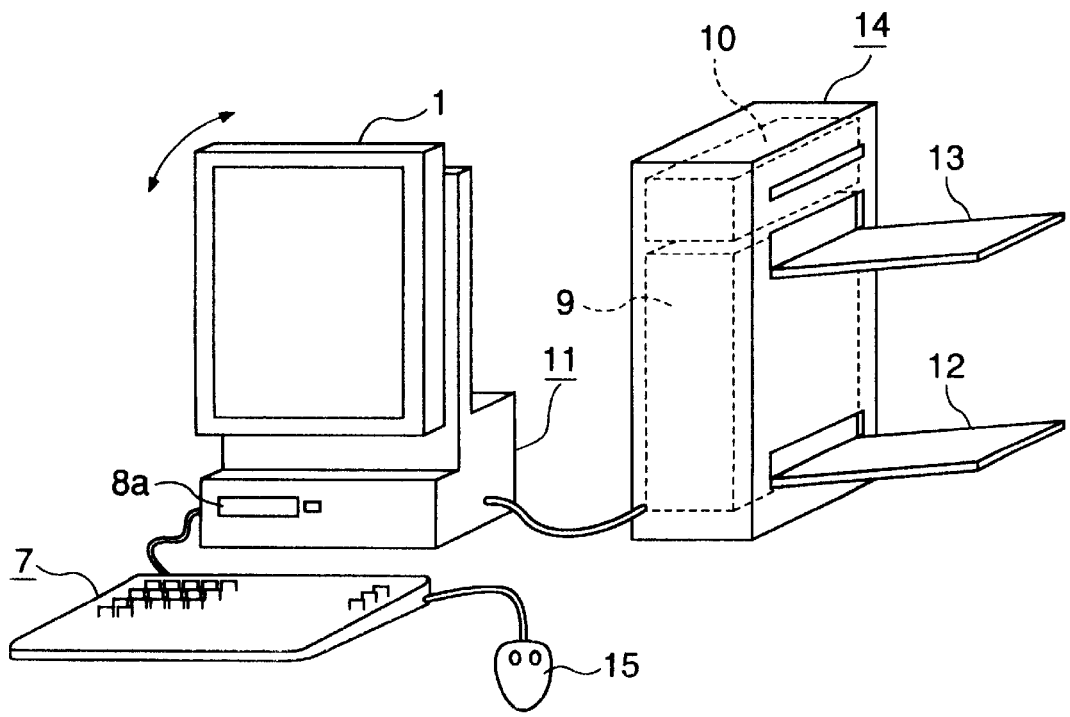
FIG. 2 is a schematic perspective view of the document image processing system according to the first embodiment as shown in FIG. 1.

FIG. 2 is a schematic perspective view of the document image processing system according to the first embodiment of the present invention. Referring to FIG. 2, the display unit 1 rotatably supported on the housing 11 of the processing system can rotate around an axis which is perpendicular to the display screen 20 as indicated by the arrow in FIG. 2. The shape of the display screen 20 of the display unit 1 in FIG. 2 is not square but rectangular as described. However, the shape of the display screen 20 is in no way limited and may be either square or rectangular. In FIG. 2, the display screen 20 is shown in its vertically oblong state. The image memory 2, the image data display part 3, the menu display part 4, the main control unit 6 and the memory unit 8 are disposed in the housing 11. In the system shown in FIG. 1, the memory unit 8 uses a magneto-optical disk as memory means, and the reference numeral 8a shown in FIG. 2 designates a slot provided for insertion and withdrawal of the magneto-optical disk.

The input unit 7 includes a plurality of alphanumeric and operation command keys together with the rotation instruction unit 5.

The optical reader unit 9 and the printer unit 10 are built in a scanner printer 14. Original documents having images to be read by the optical reader unit 9 are placed on a receiver tray 12. The original documents having the images already read by the optical reader unit 9 are placed on a delivery tray 13, and sheets printed by the printer unit 10 are also placed on the delivery tray 13.

The operation of the document image processing system having the above structure will now be described. First, original documents having images to be stored in the memory unit 8 are stacked on the receiver tray 12. Then, when the image reading is instructed from the input unit 7 or the coordinate input unit 15, the original documents placed on the tray 12 are paid out one after another from the tray 12 to be fed towards the optical reader unit 9. In the optical reader unit 9, the image carried by each of the original documents is converted into electrical digital data to be stored in the memory unit 8 using, for example, a magneto-optical disk. The original documents having been subjected to the image reading are successively stacked on the delivery tray 13.

The operation of the document image processing system reading out the image data stored in the memory unit 8 using the magneto-optical disk and then displaying the image data on the display unit 1 will now be described.

The document image data stored in the memory unit 8 using the magneto-optical disk are sorted into document files, and file names are allocated to the individual documents respectively. When the user selects one of the plural documents, the main control unit 6 reads out the image data from the selected document. The main control unit 6 supplies the read-out image data to the image data display part 3, and the image data display part 3 stores the image data in the image memory 2. The image data stored in the image memory 2 is then displayed on the display screen 20 of the display unit 1.

When the input unit 7 or the coordinate input unit 15 instructs to print out the image data displayed on the display unit 1, the image data stored in the image memory 2 is transferred to the printer unit 10 to be printed out on a sheet, and the printed sheet is delivered onto the delivery tray 13.

In the above operation, the user manipulates the coordinate input unit 15 for selecting one of a plurality of commands (a command for reading the image data, a command for displaying the list of the document file names, a command for printing the image data read out from the documents, etc.) displayed on the display screen 20 of the display unit 1 or for selecting from the list of the documents one of the documents for image data display. Thus, the manipulation of the coordinate input unit 15 informs the will of the user to the document image processing system. For the purpose of this selection, the commands and the file names having a greater possibility of selection by the user are displayed in the form of corresponding icons on the display screen 20 of the display unit 1, and the coordinate input unit 15 is manipulated to move the cursor so as to specify the desired icon by the cursor.

The screen displaying the commands and the file names having the greater possibility of selection by the user is called herein the menu screen.

Figure 3:
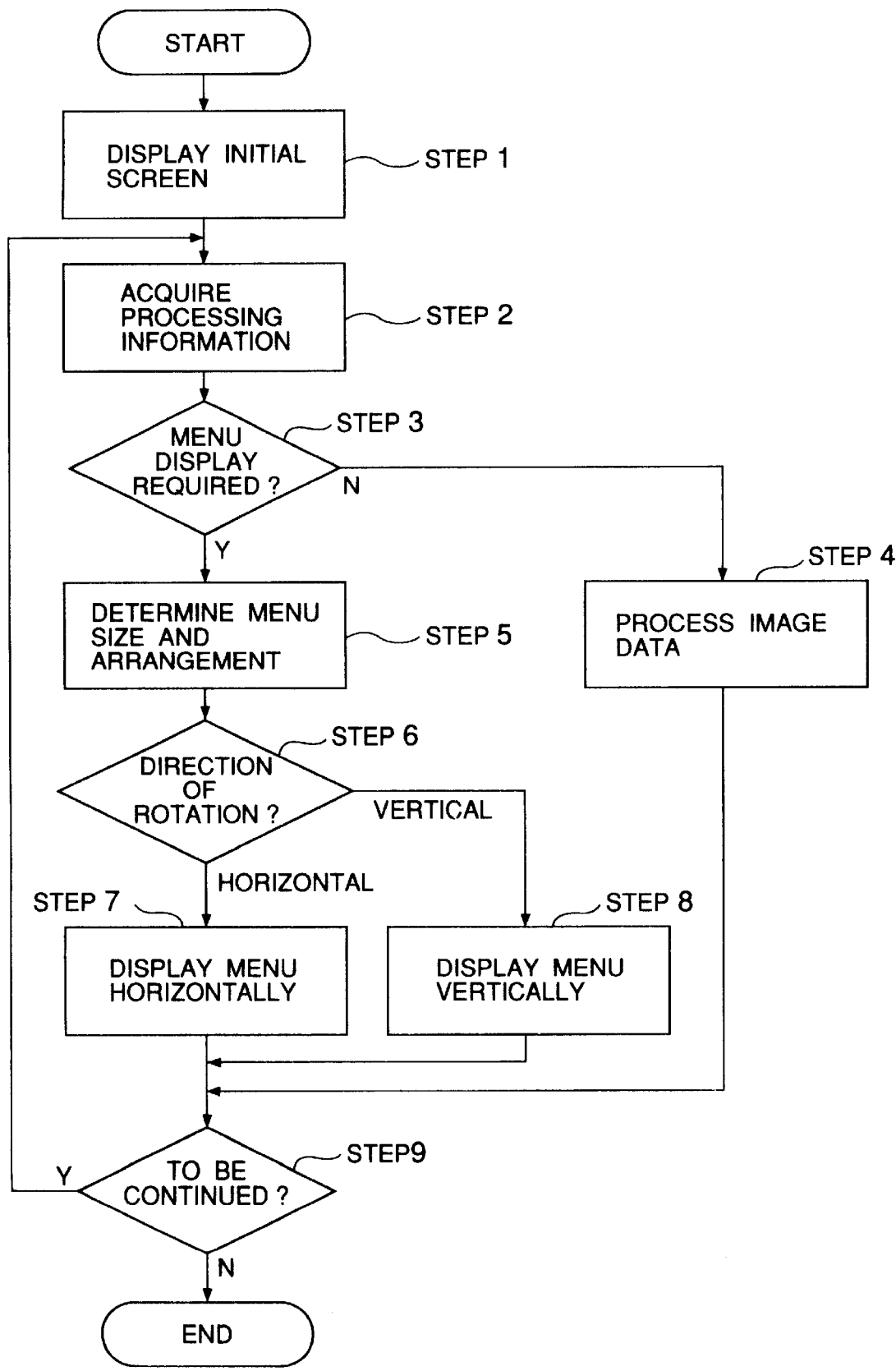
FIG. 3 is a flow chart showing the sequence of control for displaying a menu in the first embodiment of the present invention.
Figure 4A:
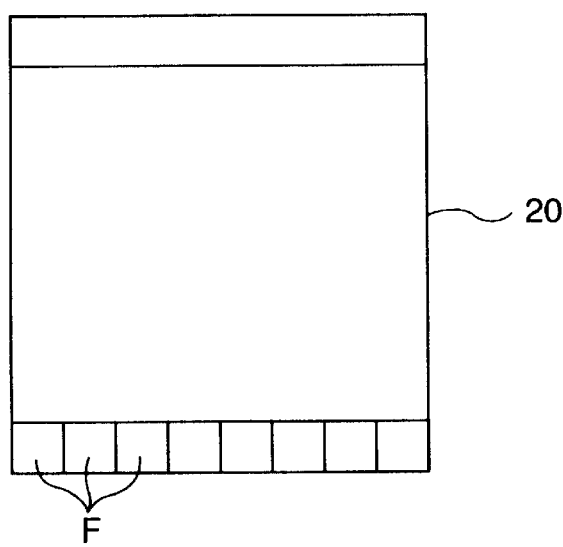
FIGS. 4A, 4B and 4C illustrate steps of displaying a menu according to the menu displaying method used in the first embodiment of the present invention.
Figure 4B:
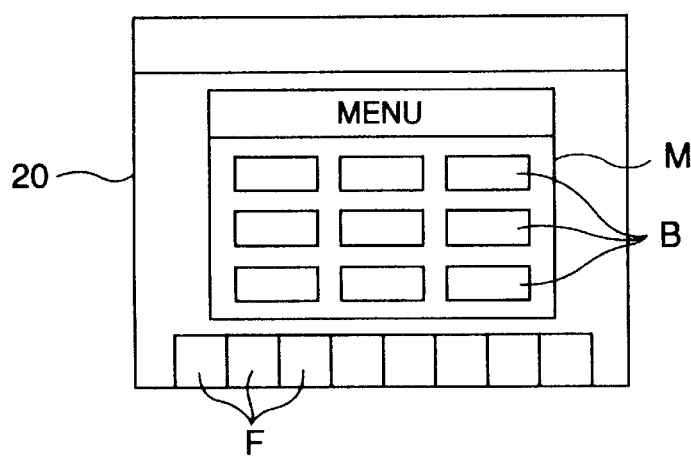
Figure 4C:
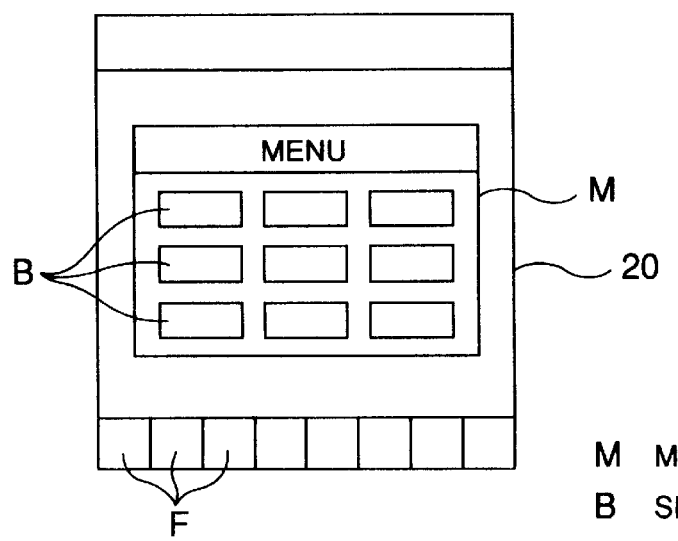

FIG. 3 is a flow chart showing schematically the sequence of control for displaying the menu screen in the document image processing system, and FIG. 4 illustrates the menu data displayed according to the first embodiment of the present invention. The menu data includes a list of the stored data and a list of the functions of the system. The operation of the image reading system will now be described by reference to FIGS. 3 and 4.

In a step 1 in FIG. 3, the system is activated to display an initial screen as shown in FIG. 4A.

Then, in a step 2, the main control unit 6 receives a processing instruction from the input unit 7, and, in a step 3, the main control unit 6 decides whether the menu display is necessary or not. When the menu display is decided to be necessary, the step 3 is followed by a step 5, while, when the menu display is decided to be unnecessary, the step 3 is followed by a step 4.

In the step 4, the main control unit 6 carries out the processing for reading out the image data stored in the memory unit 8 or supplied from the optical reader unit 9 or for writing the image data into the memory unit 8 or for outputting the image data to the printer unit 10. The step 4 is then followed by a step 9.

Figure 5A:
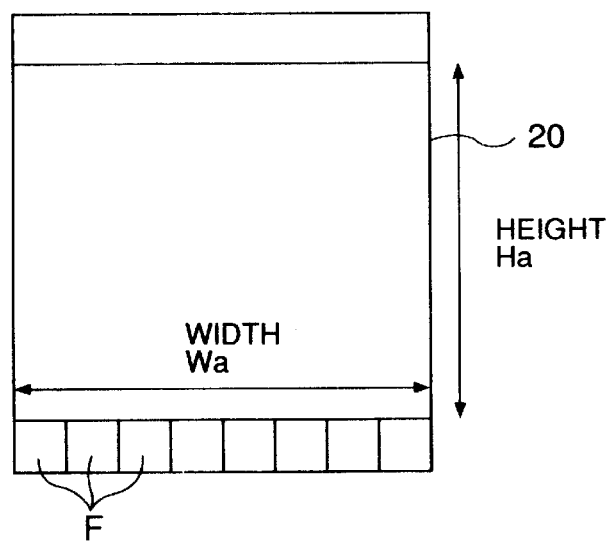
FIGS. 5A, 5B and 5C illustrate the next step of determining the layout of menu data according to the menu displaying method used in the first embodiment of the present invention.
Figure 5B:
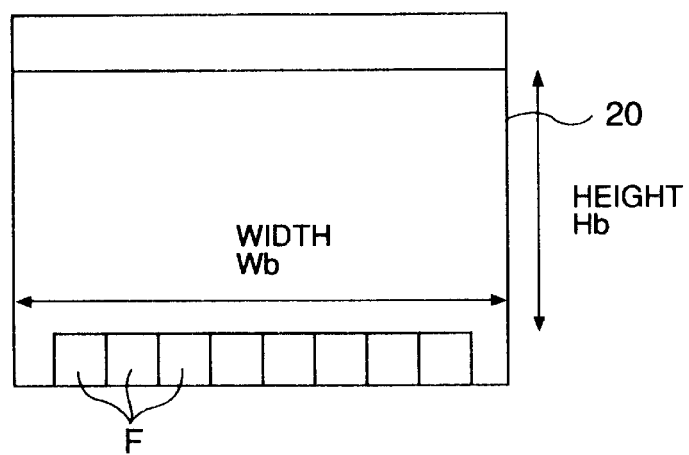
Figure 5C:
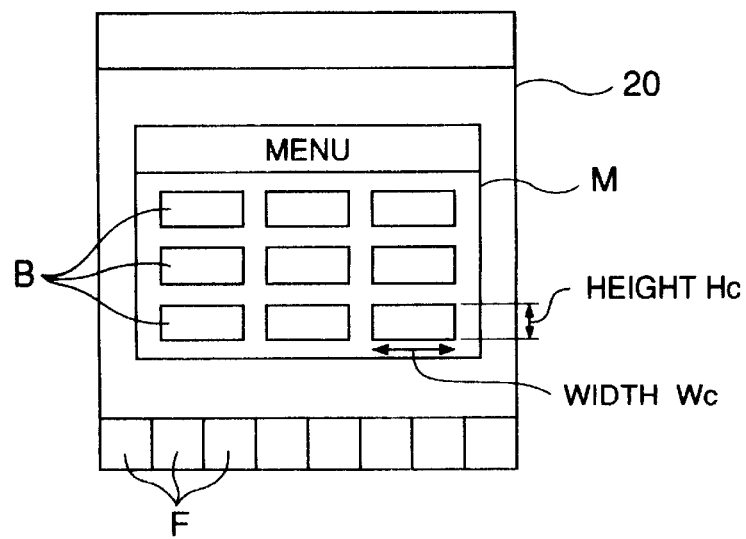

In the step 5, the layout of the menu data is determined on the basis of the displayable area (having the height Ha and the width Wa) shown in FIG. 5A when the display unit 1 is rotated to its vertical position, the displayable area (having the height Hb and the width Wb) shown in FIG. 5B when the display unit 1 is rotated to its horizontal position and the width Wc and the height Hc of each of the selection items B in the selection item display area displaying the menu data. In this case, the size of the menu display area is selected to be a maximum that can be accommodated in the area having the height Hb and the width Wa. Then, all the selection items B, B, . . . to be displayed are disposed within the size of the display area determined in the manner described above, thereby determining the menu data to be displayed. The size and layout of the menu display thus determined are kept constant regardless of whether the display unit 1 is rotated to its vertical position or its horizontal position.

Then, in a step 6, the main control unit 6 acquires the information of the rotating direction of the display unit 1 detected by the rotation instruction unit 5, and, when the display unit 1 is in the horizontal oblong state, the step 6 is followed by a step 7, while, when the display unit 1 is in the vertical oblong state, the step 6 is followed by a step 8.

In the step 7, according to the displayable area of the display unit 1 in the horizontally rotated position, the menu data are transferred from the menu display part 4 to the image memory 2 to display the menu shown in FIG. 4B on the display unit 1, and the step 7 is followed by a step 9.

In the step 8, according to the displayable area of the display unit 1 in the vertically rotated position, the menu data are transferred from the menu display part 4 to the image memory 2 to display the menu shown in FIG. 4C on the display unit 1, and the step 8 is followed by the step 9.

In the step 9, the main control unit 6 decides whether the processing is to be continued or not, and, when the result proves that the processing is to be continued, the program returns to the step 2, while, when the result proves that the processing is not to be continued, the processing program is ended.

In the flow chart schematically illustrating the steps of processing in the embodiment of the menu displaying method according to the present invention, the rotation instruction unit 5 detects the direction of rotation of the display unit 1. However, the direction of rotation may be automatically detected by a rotation sensor or may be manually detected by detecting the key input from the input unit 7.

Figure 6A:
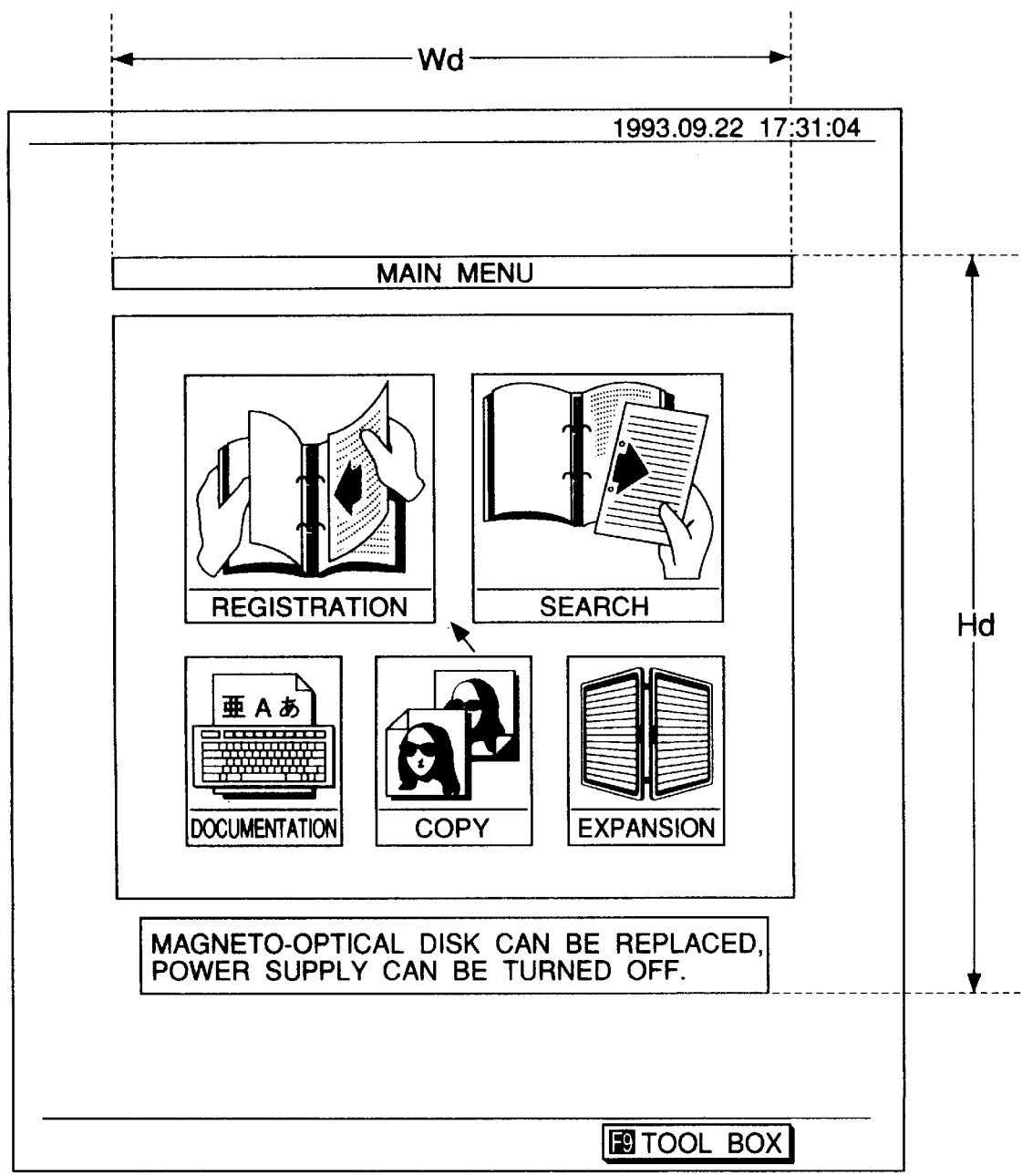
FIGS. 6A and 6B illustrate practical examples of a menu screen displayed according to the menu displaying method used in the first embodiment of the present invention.
Figure 6B:
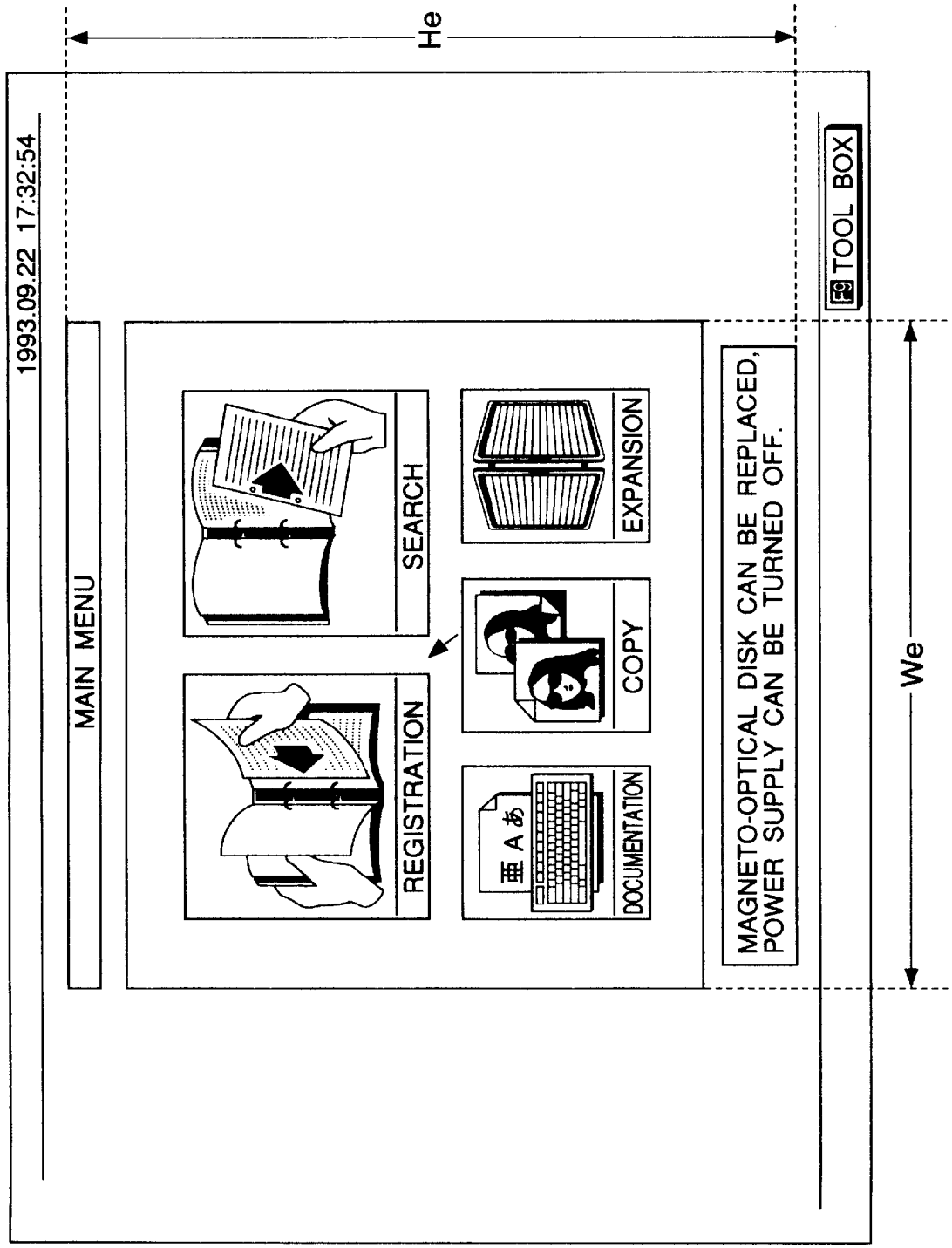
Figure 7A:
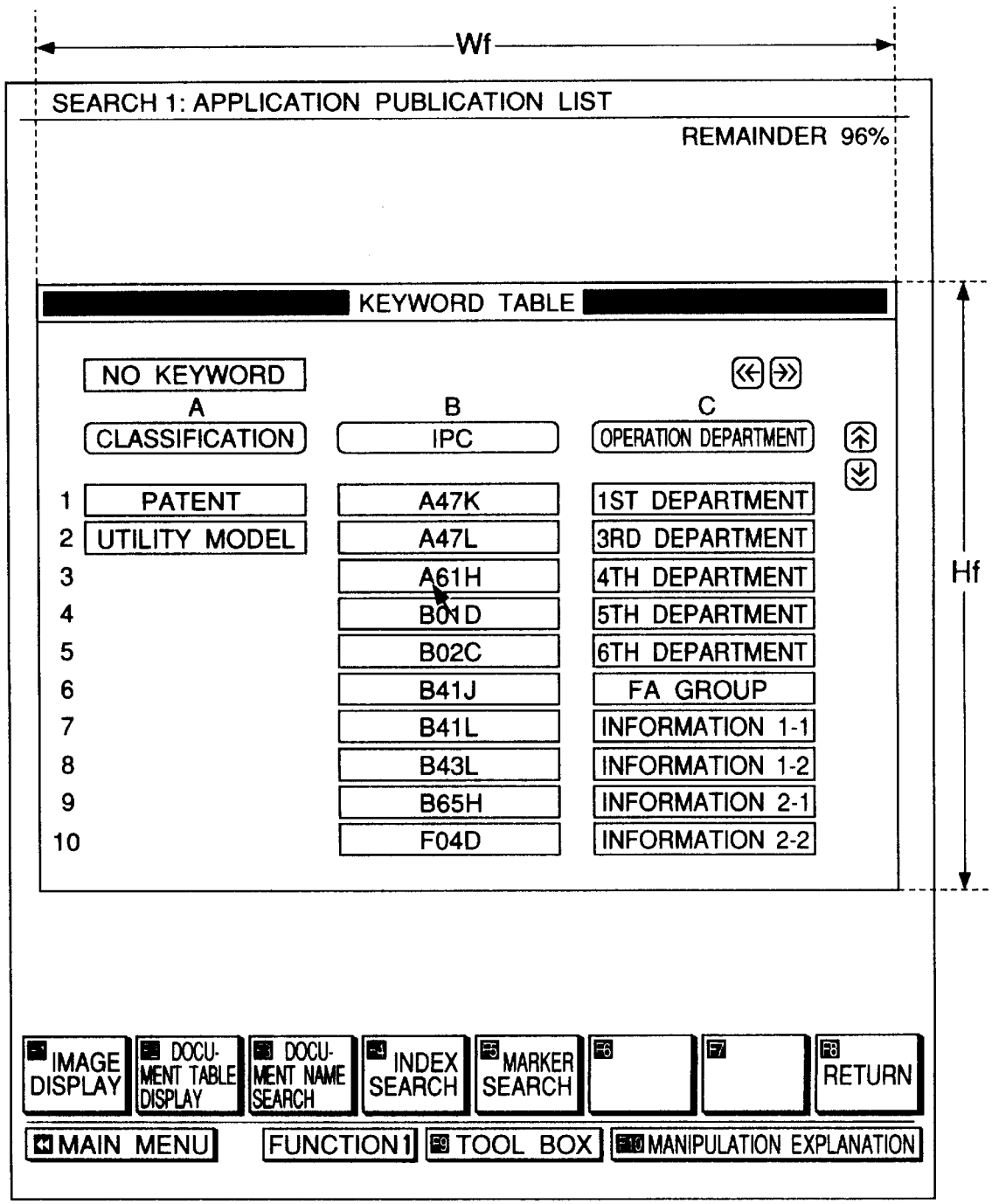

FIGS. 6A, 6B and 7A, 7B show practical examples of the menu screen. In each of these figures, the outer frame indicates the contour of the display screen. FIGS. 6A and 6B show the menu screen used for selection of the desired command from among various commands. In FIG. 6A, the display unit is shown rotated to its vertically oblong state, while, in FIG. 6B, the display unit is shown rotated to its horizontally oblong state. In FIGS. 6A and 6B, the width and height of the menu screen are Wd=We and Hd=He respectively. FIGS. 7A and 7B show the menu screen used for selection of the desired file name from among various file names. In FIG. 7A, the display unit is shown rotated to its vertically oblong state, while, in FIG. 7B, the display unit is shown rotated to its horizontally oblong state. In FIGS. 7A and 7B, the width and height of the menu screen are also Wf=Wg and Hf=Hg respectively.

A second embodiment of the present invention will now be described by reference to the drawings.

Figure 8:
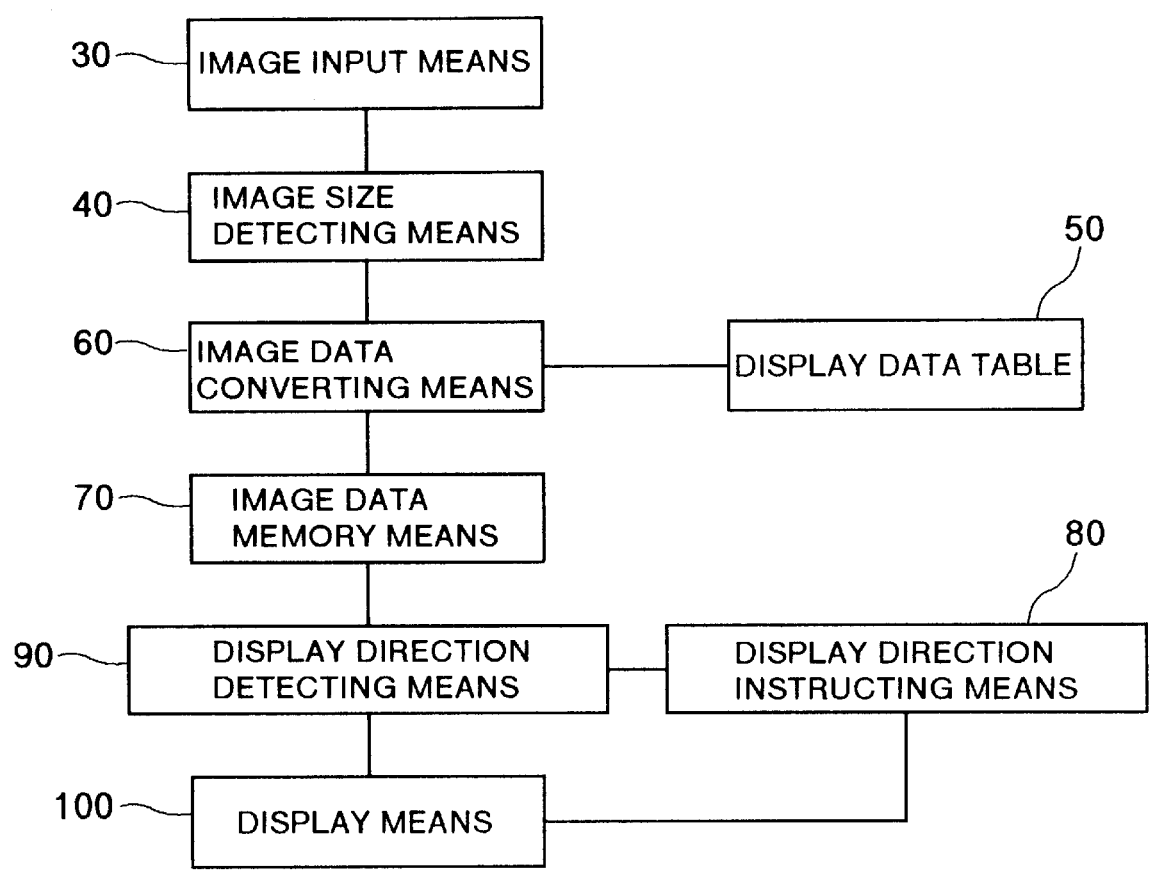
FIG. 8 is a block diagram showing the structure of a second embodiment of the document image processing system according to the present invention.

FIG. 8 is a block diagram showing the structure of the second embodiment of the document image processing system using a menu displaying method according to the present invention.

Referring to FIG. 8, the reference numeral 30 designates image input means using a plurality of alphanumeric keys, operation command keys and the like to produce images or using a mouse, a scanner or the like to read image data, character data, etc. from original documents. Besides the image inputting function, the image input means 30 has an image editing function of, for example, enlargement, reduction and rotation of image data. However, the method of image inputting by the image input means 30 is in no way limited, and the image input means 30 can be any means that can produce or read image data, character data, etc.

The reference numeral 40 designates image size detecting means for detecting the image size including the longitudinal and lateral axes of the size of image data produced or read by the image input means 30, the reference numeral 50 designates a display data table for holding data of an image data displayable area of a display or more concretely the data including the longitudinal and lateral axes of the area of the display capable of displaying the image data, the reference numeral 60 designates image data converting means associated with the image size detecting means 40 and receiving the data from the display data table 50 for converting the size of the image data by reducing or enlarging the size of the image data so that the image data of the same size can be displayed on the display irrespective of whether the display is in its vertically rotated position or its horizontally rotated position, and the reference numeral 70 designates image data memory means for storing the image data outputted from the image data converting means 60. However, the type of the image data memory means 70 is in no way limited to a magnetic tape, an optical disk or the like, and the image data memory means 70 can be any means that can store the image data.

The reference numeral 80 designates display direction instructing means for instructing the direction of rotation of the display, rotatably mounted on a housing, in the vertical direction or the horizontal direction. However, a manual method or an automatic method may be selected as desired for changing the direction of the display.

The reference numeral 90 designates display direction detecting means for detecting whether the display is rotated to its vertical position or its horizontal position on the basis of the output of the display direction instructing means 80. The reference numeral 100 designates display means rotatably connected to the housing for displaying on the display the image data stored in the image data memory means 70.

However, the type of the display means 100 is in no way limited, and the display means 100 can be any means that can display the image data on the display.

The image size detecting means 40 and the image data converting means 60 will now be specifically described in more detail.

Figure 9A:
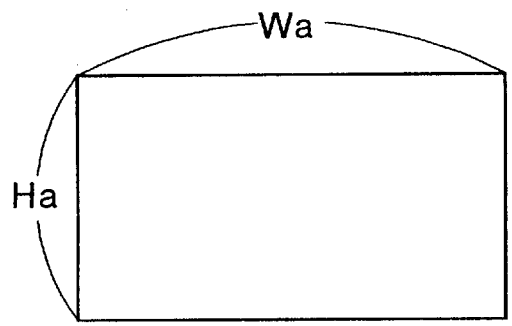
FIGS. 9A to 9C show the display in the second embodiment of the document image processing system of the present invention.
Figure 9B:
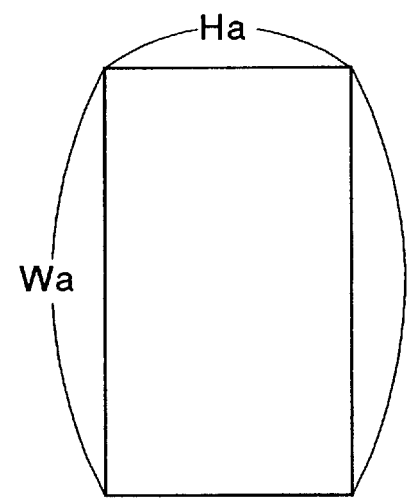
Figure 9C:
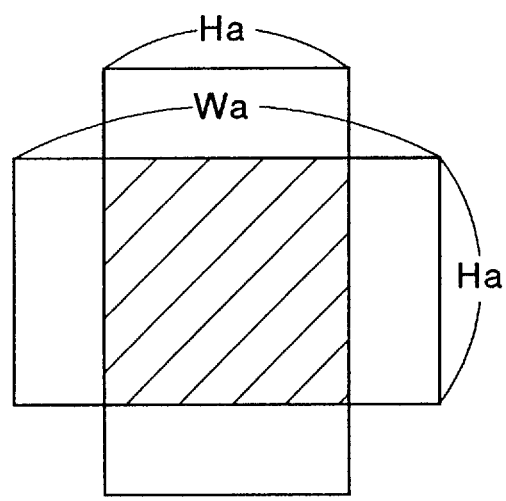

FIGS. 9A to 9C show the display of the display means 100, and the reference symbols Wa and Ha designate the major axis referred to hereinafter as a width and the minor axis referred to hereinafter as a height respectively of the display. FIG. 9A shows the display rotated to its horizontal position, while FIG. 9B shows the display rotated to its vertical position. The display is generally rectangular or square in shape, and its corners may be rounded or angled as desired. In FIGS. 9A to 9C in which the display having the generally rectangular shape is shown by way of example, the relation between Wa and Ha is expressed as Wa>Ha. On the other hand, when the display having the generally square shape is used, the relation is expressed as Wa=Ha.

Figure 10A:
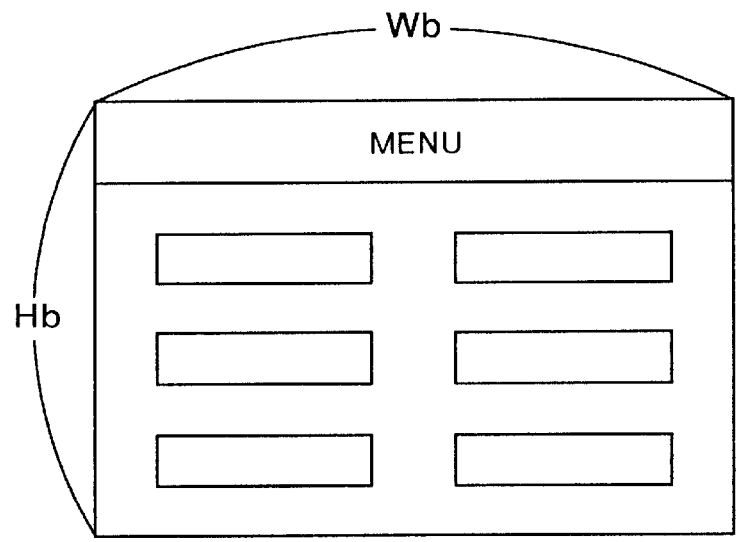
FIGS. 10A to 10C show the image data displayed in the second embodiment of the document image processing system of the present invention.
Figure 10B:
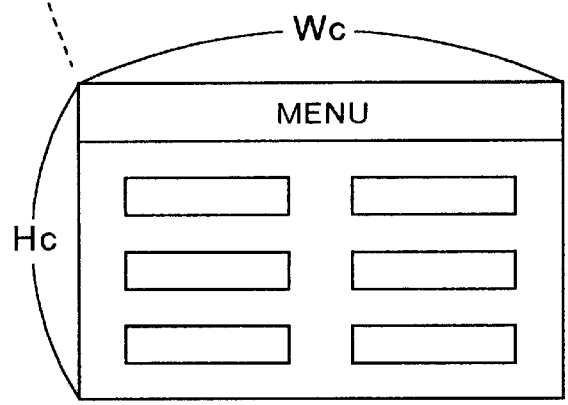
Figure 10C:
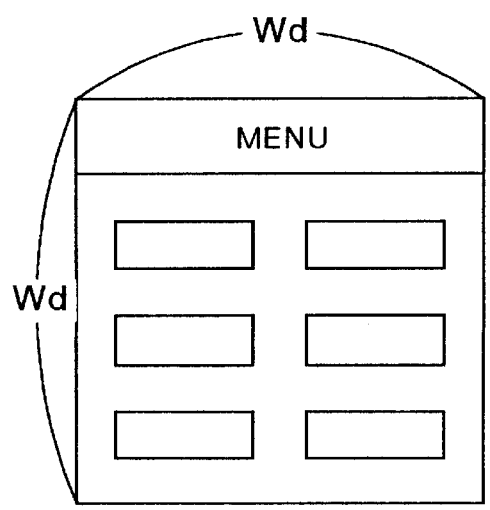
Figure 11A:
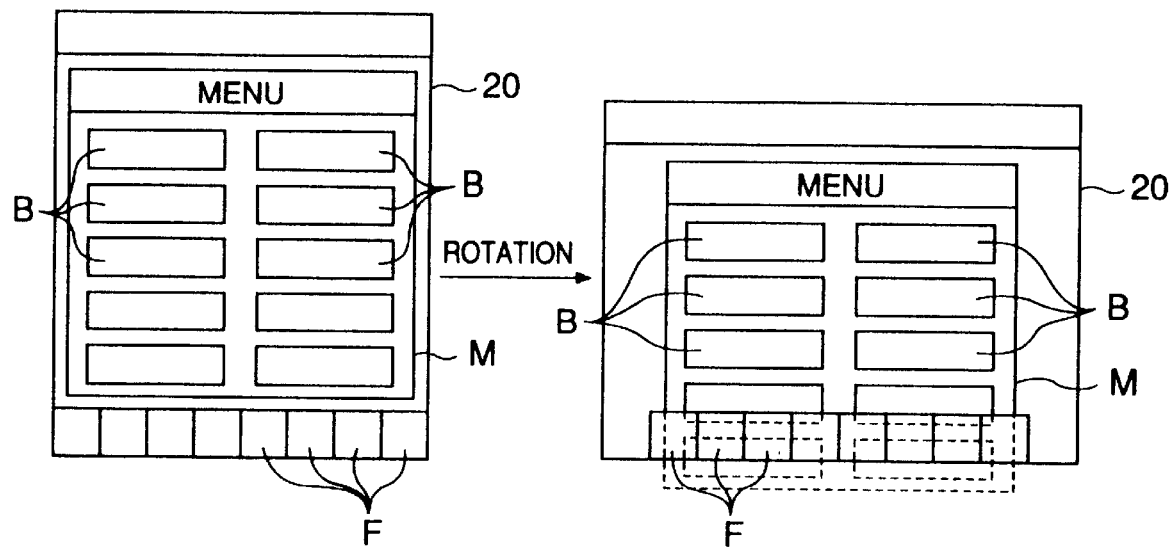
FIGS. 11A and 11B illustrate a prior art menu displaying method.
Figure 11B:
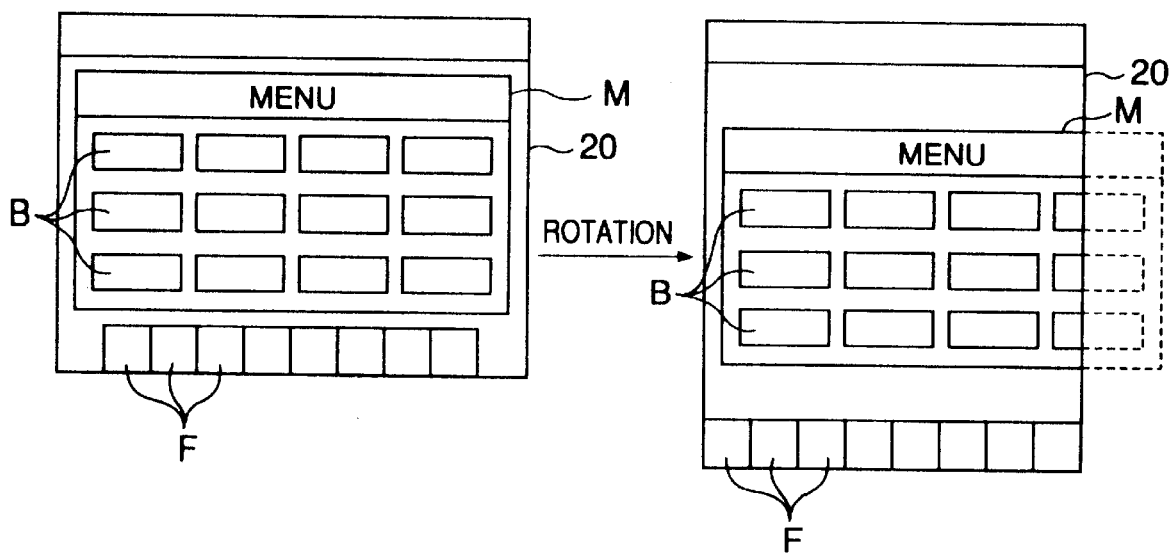
Figure 12A:
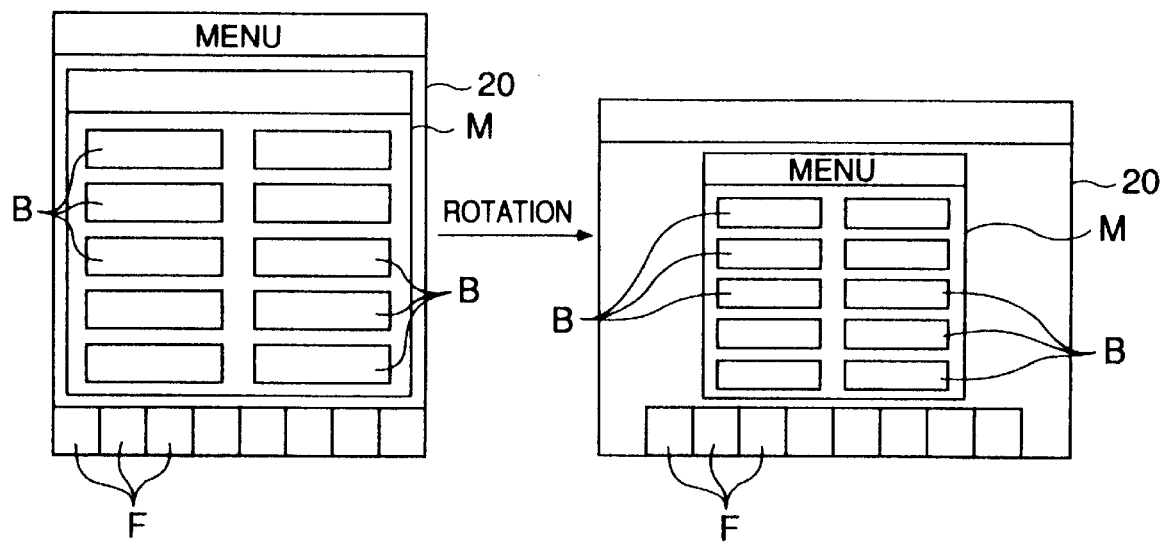
FIGS. 12A and 12B illustrate another prior art menu displaying method.
Figure 12B:
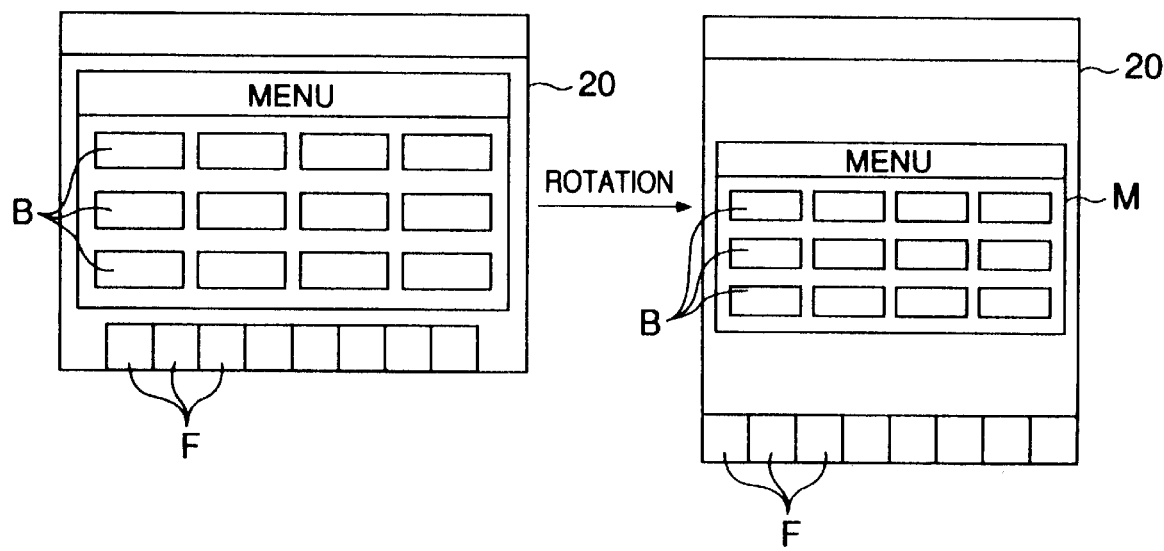
Figure 13A:
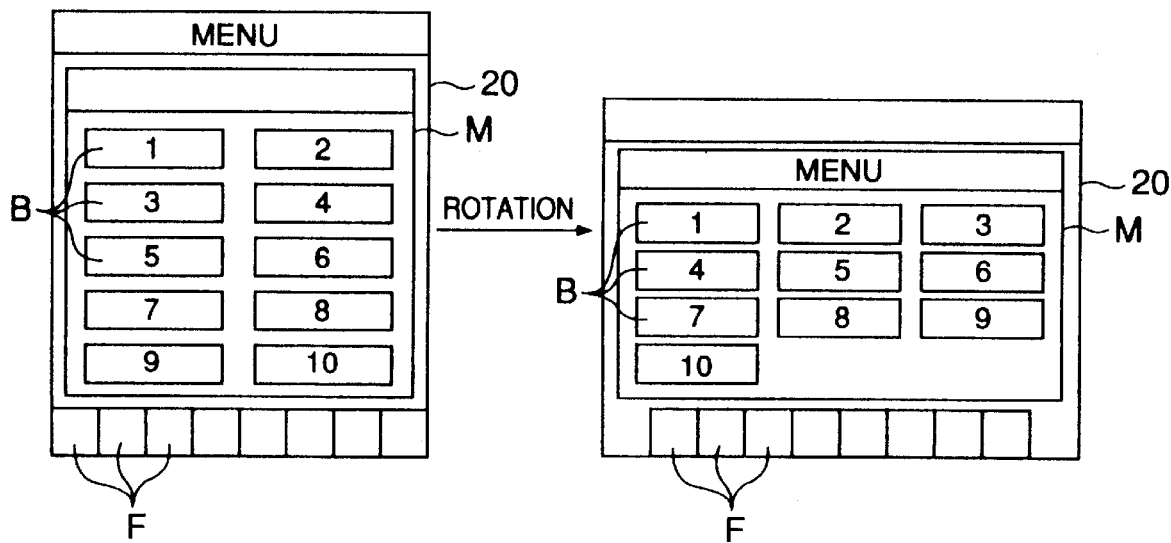
FIGS. 13A and 13B illustrate still another prior art menu displaying method.
Figure 13B:
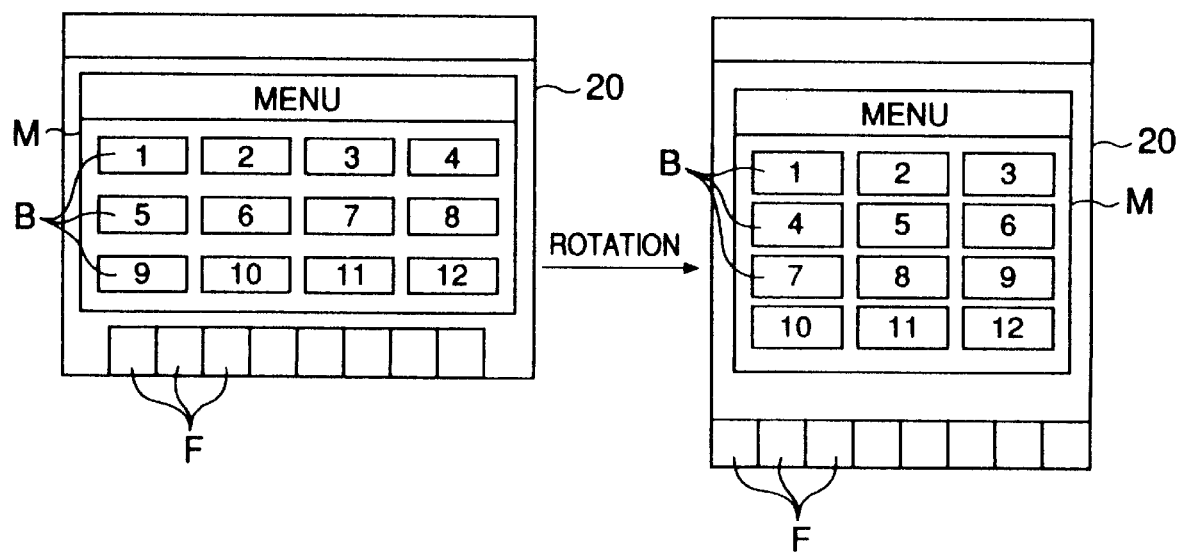

FIGS. 10A to 10C show an image to be displayed. FIG. 10A shows an original image, while FIG. 10B shows a reduced image obtained by reducing the size of the original image shown in FIG. 10A with a predetermined scale-down ratio. Therefore, the image shown in FIG. 10B is analogous to that shown in FIG. 10A.

The image size detecting means 40 is a means for detecting the major axis and the minor axis of the image read by the image input means 30. Even when the shape of an image to be read is not generally rectangular or square, a rectangle or a square that is externally tangent to the image is assumed, and the image size detecting means 40 detects the major and minor axes of the rectangle or square. When, for example, the assumed menu displayed in FIG. 10A is read by the image input means 30, the image size detecting means 40 detects that the major and minor axes of the size of the displayed menu are Wb and Hb respectively.

On the basis of the image data detected by the image data detecting means 40 and the display data held in the display data table 50, the image data converting means 60 enlarges or reduces the size of the image data read by the image input means 30 so that the image of the same size can be displayed on the display of the display means 100 irrespective of whether the display is in its horizontally rotated position or its vertically rotated position.

In the case of displaying, for example, the menu shown in FIG. 10A on the display rotated to its horizontal position shown in FIG. 9A, the menu can be properly displayed when Wb≦Wa and Hb≦Ha. However, in the case where the display is rotated to its vertical position shown in FIG. 9B from the position shown in FIG. 9A, the menu cannot be properly displayed when Wb>Ha. In such a case, the size of the displayed menu shown in FIG. 10A is to be reduced as shown in FIG. 10B, and the image data converting means 60 reduces the size of the displayed menu as shown in FIG. 10B so that the major axis Wb of the displayed menu read by the image input means 30 can be made equal to or shorter than the height Ha of the display. That is, the relation is now expressed as Wc≦Ha in FIGS. 9B and 10B.

In other words, FIG. 9C shows that the horizontal display shown in FIG. 9A and the vertical display shown in FIG. 9B are superposed on each other. It will be seen in FIG. 9C that the image displayed within the hatched area having the size Ha×Ha can be displayed in the constant shape irrespective of whether the display is rotated in its horizontal direction or its vertical direction. Therefore, when the menu shown in FIG. 10A cannot be accommodated within the extent of the hatched area shown in FIG. 9C, the size of the menu is reduced as shown in FIG. 10B until the relation Wc≦Ha is satisfied. That is, after reducing the size of the image data until the major axis of the image data becomes smaller than the height of the display, the image data is stored in the image data memory means 70.

On the other hand, when the size of the menu read by the image input means 30 is smaller than the hatched area shown in FIG. 9C, the size of the menu is to be enlarged until the relation Wc≦Ha is satisfied in a manner similar to that described above, that is, within the extent where the major axis of the image data is shorter than the height of the display.

However, whether the size of the image data is to be enlarged or reduced to satisfy the relation Wc=Ha or the relation Wc<Ha can be achieved by operating the image input means 30 each time or beforehand.

Because the size of the image read by the image input means 30 is enlarged or reduced by the above manner of processing as soon as the image is read, the image of the same size can be displayed irrespective of whether the display is in its vertically or horizontally rotated position.

Another form of enlarging or reducing the size of the image data will now be described. As shown by the hatching in FIG. 9C, the shape of the area where the vertical display and the horizontal display are super-posed on each other is a square expressed as Ha×Ha. Therefore, when the image data inputted from the image input means 30 has a rectangular shape expressed as Wb×Hb (Wb>Hb) as shown in FIG. 10A, the major axis Wb and the minor axis Hb of the image data can be enlarged or reduced to form a square shape expressed as Wd×Wd as shown in FIG. 10C. However, the relation between Ha and Wd is Ha≧Wd, and the relation Ha=Wd or the relation Ha>Wd can be suitably selected by the image input means 30.

The image data whose size is enlarged or reduced by the image data converting means 60 is displayed at a most suitable position on each of the horizontally rotated display shown in FIG. 9A and the vertically rotated display shown in FIG. 9B. However, the position at which the image data is to be displayed on the display is determined as desired by the image input means 30, and also the dimensions of the displayed image data from the left end, right end, upper end and lower end of the display can be selected as desired.

It will be understood from the foregoing description of the document image processing system according to the present invention that the size of the menu display area is selected so that the menu can be displayed in the form erected in both the displayable area of the display unit rotated to its vertical position and the displayable area of the display unit rotated to its horizontal position. The area allocated to the selection items to be displayed is selected to be located within the size of the menu display area to determine the menu data to be displayed, and the menu data thus determined are directly displayed on the display unit regardless of the direction of rotation of the display unit. Therefore, there is no possibility that the operator views a different menu each time the display unit is rotated in either direction and must recognize the details of the displayed menu each time the display unit is rotated in either direction. Thus, a very easily recognizable menu can be displayed on the display unit.

I claim:

1. A document image processing system comprising:

a display means having a display screen rotatable mounted on a housing;

image input means for reading or producing first image data;

image size detecting means for detecting a size of a major axis and a size of a minor axis of the first image data and for producing first size data representing said sizes of said major axis and said minor axis of said first image data;

a display data table for holding second size data representing a size of a major axis and a size of a minor axis of said display screen;

image data converting means for receiving said first size data and said second size data, for enlarging or reducing a size of the first image data inputted from said image input means so that said size of said major axis of said first size data is caused to be not larger than said size of said minor axis of said display screen, and for producing second image data representing said enlarged or reduced size;

image data memory means for storing the second image data produced by said image data converting means; and display direction detecting means for detecting the supported direction of the display means;

wherein said display means displays the second image data stored in said image data memory means at a predetermined position on the display screen depending on the supported direction of the display detected by said display direction detecting means.

2. A document image processing system according to claim 1, wherein said image input means includes a plurality of alphanumeric keys, operation command keys and a mouse or a scanner so that a scale of enlarging or reducing the size of the first image data and the displayed position of the second image data on the display screen can be selected as desired.

3. A document image processing system according to claim 1, wherein said image data converting means enlarges or reduces the size of the first image data so that the size of the major axis of the first image data detected by said image size detecting means is caused to be equal to the size of the minor axis of the display screen acquired from said display data table.

4. A document image processing system according to claim 1, wherein said image data converting means enlarges or reduces the size of the first image data so that the size of the major axis of the first image data detected by said image size detecting means is caused to be smaller than the size of the minor axis of the display screen acquired from said display data table.

5. A document image processing system according to claim 1, wherein said display means displays the second image data after rotating the supported direction of displaying the second image data depending on whether the display screen is directed in its vertical direction or its horizontal direction.

6. A document image processing system comprising:

image reader means for reading images of original documents;

memory means for storing image data representing the images read by said image reader means;

list memory means for storing a list of the image data stored in said memory means;

display means having a display screen of a rectangular shape;

an image memory for storing data to be displayed in a form of a generally square layout of the image data stored in the list in said list memory means, each side of said layout having almost a same size as a minor axis of said display screen;

a housing for freely rotatably supporting said display means and including processor means for processing data to be displayed on said display means; and display control means for displaying the image data stored in the list in said image memory on the display screen depending on whether said display means is rotated to a vertically oblong state or a horizontally oblong state.

7. A menu displaying method in a document image processing system including display means having a display area and being supported so as to be freely rotatable in both vertical and horizontal directions and for displaying a menu in an erected form on said display means in a relation conforming to the direction of rotation of said display means, said menu displaying method comprising the steps of:

selecting a size of a menu display area of said display means, said menu display area having a generally square shape, so as to display a menu in said erected form on said menu display area, each side of said menu display area having almost a same size as a minor axis of said display area of said display means;

providing a selection item display area of selection items to be displayed within said menu display area so as to determine menu data to be displayed; and directly displaying the determined menu data on said display means regardless of the direction of rotation of said display means.

8. A menu displaying method according to claim 7, wherein a size of said menu display area permitting the erected menu display is selected to be a maximum that can be displayed on both the displayable area of said display means when said display means is rotated to its vertical position and the displayable area of said display means when said display means is rotated to its horizontal position.

9. In a document image processing system including display means supported so as to be freely rotatable in both the vertical direction and the horizontal direction for displaying a menu in an erected form on said display means in a relation conforming to the direction of rotation of said display means, a menu displaying method comprising the steps of:

selecting the size of a menu display area so as to display a menu in an erected form on both the displayable area of said display means when said display means is rotated to its vertical position and the displayable area of said display means when said display means is rotated to its horizontal position;

disposing a display area of selection items to be displayed within the size of said menu display area so as to determine the menu data to be displayed; and directly displaying the determined menu data on said display means regardless of the direction of rotation of said display means, wherein the size of said menu display area permitting the erected menu display is selected to be a maximum that can be displayed on both the displayable area of said display means when said display means is rotated to its vertical position and the displayable area of said display means when said display means is rotated to its horizontal position.

* * * * *